United States Patent
McCann et al.

(10) Patent No.: US 11,792,073 B2
(45) Date of Patent: Oct. 17, 2023

(54) METHOD AND SYSTEM FOR LOAD BALANCING OF SENSORS

(71) Applicant: BlackBerry Limited, Waterloo (CA)

(72) Inventors: Stephen John McCann, Southampton (GB); Michael Peter Montemurro, Toronto (CA); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/841,073

(22) Filed: Jun. 15, 2022

(65) Prior Publication Data
US 2022/0321410 A1    Oct. 6, 2022

Related U.S. Application Data

(63) Continuation of application No. 16/112,263, filed on Aug. 24, 2018, now Pat. No. 11,394,615.

(30) Foreign Application Priority Data

Sep. 1, 2017   (EP) .................................. 17188945

(51) Int. Cl.
*H04W 4/70*      (2018.01)
*H04L 41/0823*   (2022.01)
(Continued)

(52) U.S. Cl.
CPC ........ *H04L 41/0836* (2013.01); *G08B 21/182* (2013.01); *H04B 17/318* (2015.01);
(Continued)

(58) Field of Classification Search
CPC . H04L 41/0836; H04L 67/125; H04B 17/125; H04W 4/70; H04W 24/02;
(Continued)

(56) References Cited

U.S. PATENT DOCUMENTS 6,549,524 B1 * 4/2003 Shin ...................... H04W 36/18
                                                             455/442
7,577,502 B1    8/2009 Henry
(Continued)

FOREIGN PATENT DOCUMENTS

| CN | 103404176 A | 11/2013 |
|----|-------------|---------|
| WO | 2012/097321 A1 | 7/2012 |
| WO | 2017/117674 A1 | 7/2017 |

OTHER PUBLICATIONS

IEEE Standards Association, IEEE Standard; IEEE 802.15.4s-2018: "IEEE Standard for Low-Rate Wireless Networks, Amendment 6: Enabling Spectrum Resource Measurement Capability", published Jun. 27, 2018.

(Continued)

*Primary Examiner* — Hai V Nguyen
(74) *Attorney, Agent, or Firm* — Moffat & Co

(57) ABSTRACT

A method for balancing sensors within a sensor system, the method including receiving, at a gateway, data from a plurality of sensors, each of the plurality of sensors being connected to one of a plurality of sensor modules or the gateway; determining, at the gateway, that a signal strength from a first sensor falls below a threshold, the first sensor being one of the plurality of sensors; and based on the determining, allocating the first sensor to connect to a different one of the plurality of sensor modules, or to the gateway if connected to one of the plurality of sensor modules.

19 Claims, 6 Drawing Sheets

(51) Int. Cl.

| | |
|---|---|
| *H04W 48/00* | (2009.01) |
| *H04W 24/02* | (2009.01) |
| *H04W 40/24* | (2009.01) |
| *H04L 67/125* | (2022.01) |
| *H04W 40/14* | (2009.01) |
| *H04W 24/08* | (2009.01) |
| *H04B 17/318* | (2015.01) |
| *G08B 21/18* | (2006.01) |
| *H04W 36/30* | (2009.01) |
| *H04W 4/40* | (2018.01) |
| *H04W 40/12* | (2009.01) |
| *G07C 5/08* | (2006.01) |
| *H04W 24/04* | (2009.01) |
| *H04W 84/18* | (2009.01) |
| *H04W 88/16* | (2009.01) |

(52) U.S. Cl.
CPC ............ *H04L 67/125* (2013.01); *H04W 4/70* (2018.02); *H04W 24/02* (2013.01); *H04W 24/08* (2013.01); *H04W 36/30* (2013.01); *H04W 40/14* (2013.01); *H04W 40/248* (2013.01); *H04W 48/17* (2013.01); *G07C 5/0841* (2013.01); *H04W 4/40* (2018.02); *H04W 24/04* (2013.01); *H04W 40/12* (2013.01); *H04W 84/18* (2013.01); *H04W 88/16* (2013.01)

(58) Field of Classification Search
CPC ..... H04W 24/08; H04W 36/30; H04W 40/14; H04W 40/248; H04W 48/17; H04W 4/40; H04W 24/04; H04W 40/12; H04W 84/18; H04W 88/16; G07C 5/0841

See application file for complete search history.

(56) References Cited

U.S. PATENT DOCUMENTS

| | | | | |
|---|---|---|---|---|
| 7,822,005 | B2 * | 10/2010 | Ptasinski | H04M 11/06 |
| | | | | 370/349 |
| 8,040,959 | B2 * | 10/2011 | Waters | H04L 25/03006 |
| | | | | 375/346 |
| 8,078,190 | B2 * | 12/2011 | Noonan | H04M 1/72454 |
| | | | | 455/457 |
| 8,694,023 | B2 * | 4/2014 | Hu | H04W 64/00 |
| | | | | 455/433 |
| 8,805,436 | B2 * | 8/2014 | Woo | H04M 1/72469 |
| | | | | 455/435.2 |
| 9,730,229 | B2 * | 8/2017 | Lee | H04W 72/51 |
| 9,860,677 | B1 | 1/2018 | Agerstam | |
| 9,961,479 | B2 * | 5/2018 | Eom | H04W 8/065 |
| 10,178,593 | B2 * | 1/2019 | Talbert | H04M 15/88 |
| 10,375,732 | B2 * | 8/2019 | Mestanov | H04W 72/566 |
| 10,798,527 | B2 * | 10/2020 | Jadav | H04W 4/029 |
| 11,006,422 | B2 * | 5/2021 | Kaushik | H04B 7/0417 |
| 11,052,255 | B2 * | 7/2021 | Brisben | A61N 1/3684 |
| 11,064,525 | B2 * | 7/2021 | Mestanov | H04W 72/566 |
| 11,394,615 | B2 * | 7/2022 | McCann | H04W 24/08 |
| 2006/0199558 | A1 * | 9/2006 | Chiodini | H04B 1/7075 |
| | | | | 375/E1.003 |
| 2007/0142071 | A1 * | 6/2007 | Hart | H04W 4/10 |
| | | | | 455/518 |
| 2007/0252603 | A1 * | 11/2007 | Restrepo | H02H 1/0015 |
| | | | | 324/536 |
| 2008/0243343 | A1 * | 10/2008 | Kumagai | B60R 21/0134 |
| | | | | 701/45 |
| 2010/0027510 | A1 * | 2/2010 | Balasubramanian | |
| | | | | H04W 48/18 |
| | | | | 370/332 |
| 2012/0084839 | A1 | 4/2012 | Ayyagari | |
| 2013/0122935 | A1 * | 5/2013 | Das | H04W 4/029 |
| | | | | 455/456.6 |
| 2013/0191397 | A1 * | 7/2013 | Avadhanam | G06F 16/24578 |
| | | | | 707/E17.084 |
| 2014/0003263 | A1 | 1/2014 | Sheriff | |
| 2014/0086214 | A1 | 3/2014 | Hong | |
| 2014/0274031 | A1 | 9/2014 | Menendez | |
| 2014/0349568 | A1 | 11/2014 | Niemela | |
| 2014/0355499 | A1 | 12/2014 | Akhlaq | |
| 2015/0112485 | A1 | 4/2015 | Cui | |
| 2015/0215793 | A1 * | 7/2015 | Siomina | H04W 64/00 |
| | | | | 455/456.1 |
| 2015/0373481 | A1 * | 12/2015 | Eom | H04W 48/16 |
| | | | | 370/329 |
| 2017/0156034 | A1 | 6/2017 | Smith | |
| 2018/0097572 | A1 | 4/2018 | Shibata | |
| 2018/0177429 | A1 * | 6/2018 | Flynn | A61B 5/4381 |
| 2018/0184298 | A1 * | 6/2018 | Chen | H04W 12/63 |
| 2018/0211176 | A1 | 7/2018 | Khurshudov | |
| 2018/0234902 | A1 * | 8/2018 | Talbert | H04W 36/14 |
| 2018/0279389 | A1 | 9/2018 | Kwag | |
| 2019/0075025 | A1 * | 3/2019 | McCann | H04W 24/02 |
| 2019/0320466 | A1 * | 10/2019 | Mestanov | H04W 74/0816 |
| 2019/0383921 | A1 * | 12/2019 | Argentieri | G08B 21/22 |
| 2020/0100063 | A1 * | 3/2020 | Jadav | H04W 4/02 |
| 2021/0195489 | A1 * | 6/2021 | Strater | H04W 36/08 |
| 2021/0263514 | A1 * | 8/2021 | Zhong | G05D 1/0272 |
| 2021/0321459 | A1 * | 10/2021 | Mestanov | H04W 74/0808 |
| 2021/0357709 | A1 * | 11/2021 | Masui | G01S 13/931 |

OTHER PUBLICATIONS

European Patent Office, Extended European Search Report for Application No. 17188945.4, dated Nov. 7, 2017.

International Search Authority, International Search Report and Written Opinion for International Application No. PCT/EP2018/073043, dated Nov. 13, 2018.

European Examination Report dated Jul. 3, 2020 on European Application No. 17188945.4.

Chinese State Intellectual Property Office, Notice of First Office Action, Application CN 201880066014.X, dated Dec. 28, 2022, pp. 1-5 of the original Chinese and pp. 1-7 of the English translation.

\* cited by examiner

METHOD AND SYSTEM FOR LOAD BALANCING OF SENSORS

FIELD OF THE DISCLOSURE

The present disclosure relates to sensor networks, and in particular relates to configuration and reconfiguration of sensors within sensor networks.

BACKGROUND

Automotive sensors provide information or alarms when equipment requires maintenance. For example, such sensors may include tire pressure monitoring, wheel bearing, weight distribution, fuel status, temperature, humidity, among other such sensors.

Sensors may be wired or wireless. Wired sensors may be connected to a common bus in some cases, such as a Control Area Network (CAN) bus. Further, wireless sensors including Bluetooth Low Energy (BLE) are increasingly becoming simple and cheap alternatives to wired sensors and are easy to install in a vehicle or trailer.

However, when a vehicle system has a plurality of sensors, such sensors may be difficult to correctly provision within the vehicle and it further may be difficult to balance communications within such sensor system.

Further, once provisioned, in today's automotive systems inspection and maintenance of sensors is typically done manually or in some cases the inspection may never happen if the sensor is integral to a unit. Manual inspection typically occurs when a trailer or automobile is stationary and detection of problems with the sensors can depend on the skill of the operator and can be error-prone.

BRIEF DESCRIPTION OF THE DRAWINGS

The present disclosure will be better understood with reference to the drawings, in which.

DETAILED DESCRIPTION OF THE DRAWINGS

Figure 1:
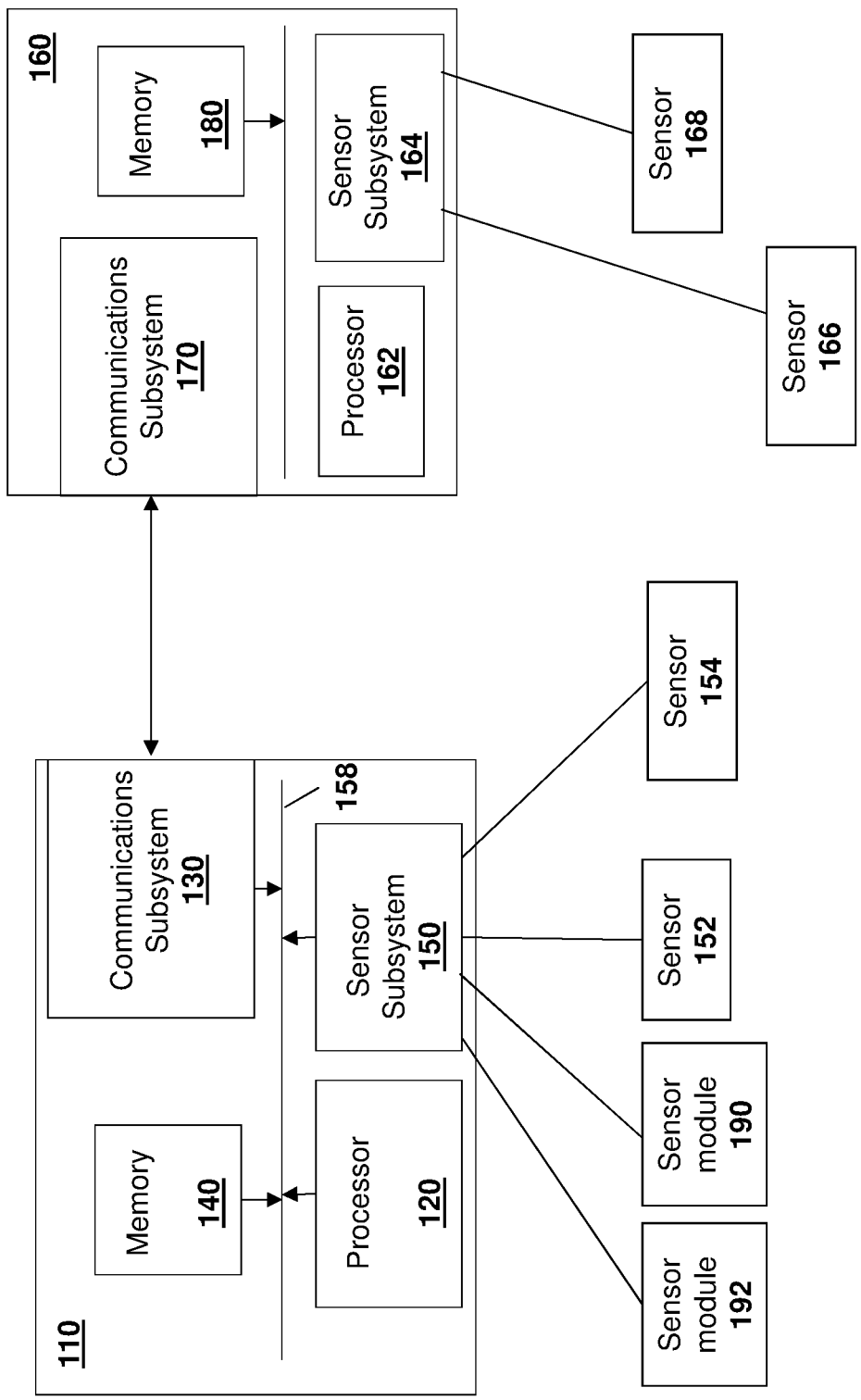
FIG. 1 is a block diagram showing an example gateway and sensor module capable of being used in accordance with the embodiments of the present disclosure.

The present disclosure provides a method for balancing sensors within a sensor system, the method comprising: receiving, at a gateway, data from a plurality of sensors, each of the plurality of sensors being connected to one of a plurality of sensor modules or the gateway; determining, at the gateway, that a signal strength (or other measures) from a first sensor falls below a threshold, the first sensor being one of the plurality of sensors; and based on the determining, allocating the first sensor to connect to a different one of the plurality of sensor modules, or to the gateway if connected to one of the plurality of sensor modules.

The present disclosure further provides a gateway for balancing sensors within a sensor system, the gateway comprising: a processor; and a communications subsystem, wherein the gateway is configured to: receive data from a plurality of sensors, each of the plurality of sensors being connected to one of a plurality of sensor modules or the gateway; determine that a signal strength (or other measures) from a first sensor falls below a threshold, the first sensor being one of the plurality of sensors; and based on the determination, allocate the first sensor to connect to a different one of the plurality of sensor modules, or to the gateway if connected to one of the plurality of sensor modules.

The present disclosure further provides a computer readable medium for storing program instructions for balancing sensors within a sensor system, which when executed by a processor of a gateway cause the gateway to: receive data from a plurality of sensors, each of the plurality of sensors being connected to one of a plurality of sensor modules or the gateway; determine that a signal strength (or other measures) from a first sensor falls below a threshold, the first sensor being one of the plurality of sensors; and based on the determination, allocate the first sensor to connect to a different one of the plurality of sensor modules, or to the gateway if connected to one of the plurality of sensor modules.

In accordance with the present disclosure, a system and method for allowing for sensors on a vehicle to be provisioned, checked and balanced is provided. The system and method allow for an efficient configuration of sensors and sensor modules to be achieved. As described below, a sensor module is a module that connects to, and collects data from, multiple sensors prior to passing data to a sensor hub or gateway.

Sensors need to be managed. This is time-consuming from a maintenance perspective to check each individual sensor and replace damaged ones. Further, sensor maintenance is typically only done at the beginning of a journey or during vehicle maintenance.

Wireless sensors may appear to be working correctly when investigated individually. However, when part of a system, the sensors may cease to work. In some cases, relocating a sensor even a few centimeters may improve the radio link quality to or from another point on the vehicle.

Further, the integrity of the wireless link between a sensor and a sensor module, or between a sensor module and a gateway can change depending on environmental conditions. For instance, sensors installed on a trailer may have different optimal distribution of sensor hub connections depending on whether the trailer is loaded or unloaded.

In some cases, a sensor module could be mobile relative to the sensor hub or gateway. For example, a sensor module mounted on a crane may move relative to a gateway or hub. Based on the embodiments below, such sensor module may connect to different sensor hubs, depending on its position.

Further, the distribution of sensors may vary depending on applications and the way that sensors are distributed may affect which hub or sensor module a sensor connects to. In one example, the sensors may be distributed to allow each radio link between sensor and gateway or hub to operate using a low amount of energy, thus increasing the battery life of some or all components. If some components are battery powered and some are wired to a power source, then the sensors can be distributed in such a way to reduce the radio power usage of the battery powered components.

A further issue with configuration of sensors is to determine which conditions trigger a sensor to connect between different hubs.

Therefore, in accordance with the embodiments of the present disclosure, "sensor balancing" is added to a sensor system, where such sensor balancing allows calibration and balancing of all sensors within the sensor system. This type of sensor hub allows for: provisioning of the sensor system; an initial check of the sensor system; balancing of the sensor system; additional removal of sensors; dynamic balancing of the sensors, and policy and cloud storage data flows.

While the present disclosure is described with regards to vehicle or trailer sensor systems, the methods of balancing sensors described herein could equally be used with other sensor systems. As such, the present disclosure is not limited to vehicular sensor systems.

One example sensor system is shown with regard to FIG. 1. The sensor system of FIG. 1 is however merely an example and other sensor systems could equally be used in accordance with the embodiments of the present disclosure.

The sensor system of FIG. 1 includes a gateway 110, which can be any computing device or network node. In some embodiments, gateway 110 may also be referred to as a hub or sensor hub. Gateway 110 may include any type of electronic device, including but not limited to, fleet tracking devices, mobile devices such as smartphones or cellular telephones, other fixed or mobile devices, such as IOT devices, endpoints, home automation devices, medical equipment in hospital or home environments, inventory tracking devices, environmental monitoring devices, energy management devices, infrastructure management devices, vehicles or devices for vehicles, fixed electronic devices, among other options.

Gateway 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example different radio technologies.

Communications subsystem 130 allows gateway 110 to communicate with other devices or network elements. Communications subsystem 130 may use one or more of a variety of communications types, including but not limited to cellular, satellite, Bluetooth™, Bluetooth™ Low Energy (BLE), Wi-Fi, wireless local area network (WLAN), wireless personal area networks (WPAN), near field communications (NFC), ZigBee or any other IEEE 802.15 low power technology, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

Processor 120 generally controls the overall operation of the gateway 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, the gateway 110 may access data or programmable logic from an external storage medium, for example through communications subsystem 130.

In the embodiment of FIG. 1, gateway 110 may utilize a plurality of sensors, which may either be part of gateway 110 in some embodiments or may communicate with gateway 110 in other embodiments. For internal sensors, processor 120 may receive input from a sensor subsystem 150.

For external sensors, sensors 152 and 154 are shown in the embodiment of FIG. 1.

Examples of sensors include, but are not limited to, a positioning sensor, a vibration sensor, a temperature sensor, one or more image sensors, accelerometer, light sensors, gyroscopic sensors, or other sensors. Other sensors may be any sensor that is capable of reading or obtaining data that may be useful for gateway 110. However, such list of sensors is merely provided as an example, and in other embodiments different sensors or a subset of sensors may be used.

In other embodiments, gateway 110 may not have any sensors, either internal or external, associated directly to it. For example, in some embodiments, gateway 110 may instead communicate with sensor modules, as described below.

Communications between the various elements of gateway 110 may be through an internal bus 158 in one embodiment. However, other forms of communication are possible.

As such, gateway 110 is a unit, which allows multiple sensors or sensor modules to be connected within a single system, for example on an automobile. Gateway 110 collects data and processes the information, allowing decisions to be made as to the state of the sensor system.

A sensor system may further include one or more sensor modules. A sensor module is an element that allows communication from various sensors, where data can be received, stored, compiled, and/or processed prior to being passed to another element in the system, such as gateway 110. A sensor system allows individual sensors to power down when readings are not required.

For example, in the embodiment of FIG. 1, a sensor module 160 is shown. Sensor module 160 comprises a processor 162 and at least one communications subsystem 170, where the processor 162 and communications subsystem 172 cooperate to perform the methods of the embodiments described herein. Communications subsystem 170 may, in some embodiments, comprise multiple subsystems, for example different radio technologies.

Communications subsystem 170 allows sensor module 160 to communicate with other devices or network elements. Communications subsystem 170 may use one or more of a variety of communications types, but would typically use short range communication such as, but not limited to Bluetooth™, BLE, Wi-Fi, WLAN, WPAN, NFC, ZigBee or other IEEE 802.15 low power technology, or wired connections such as Ethernet or fiber, among other options.

As with communications subsystem 130, a communications subsystem 170 will typically have one or more receivers and transmitters, as well as associated components such as one or more antenna elements, local oscillators (LOs), and may include a processing module such as a digital signal processor (DSP). Again, the particular design of the communication subsystem 170 will be dependent upon the communication network or communication technology on which the sensor module is intended to operate.

Processor 162 generally controls the overall operation of the sensor module 160 and is configured to execute programmable logic, which may be stored, along with data, using memory 180. Memory 180 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 180, sensor module 160 may access data or programmable logic from an external storage medium, for example through communications subsystem 170.

In the embodiment of FIG. 1, sensor module 160 may utilize a plurality of sensors, which may either be part of sensor module 160 in some embodiments or may communicate with sensor module 160 in other embodiments. For internal sensors, processor 162 may receive input from a sensor subsystem 164.

For external sensors, sensors 166 and 168 are shown in the embodiment of FIG. 1.

Gateway 110 may communicate with zero, one, or a plurality of sensor modules. In the example of FIG. 1, in addition to sensor module 160, gateway 110 communicates with sensor modules 190 and 192.

Using sensor modules 160, 190 and 192 allows gateway 110 to interrogate the sensor modules for data, rather than having to individually access each sensor.

In a sensor system, typically the gateway 110 will communicate with external network resources, while sensor module 160 will typically communicate internally, for example with the gateway 110, other sensor modules, or sensors.

The sensor system, including gateway 110, may be affixed to any fixed or portable platform. For example, gateway 110 may be affixed to shipping containers, truck trailers, truck cabs in one embodiment. In other embodiments, gateway 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), pedestrians and bicycles and other types of vehicles including any combinations of any of the foregoing, whether currently existing or after arising, among others.

In other cases, gateway 110 could be carried by a user.

In other cases, gateway 110 may be affixed to stationary objects including buildings, lamp posts, fences, cranes, temporary fixtures such as emergency shelters and tents, among other options.

Such sensor system, and specifically gateway 110, sensor modules 160, 190 or 192, or sensors 152, 154, 166 or 168 may be a power limited devices. For example, gateway 110 could be a battery operated device that can be affixed to a shipping container or trailer in some embodiments. Other limited power sources could include any limited power supply, such as a small generator or dynamo, a fuel cell, solar power, among other options.

In other embodiments, components of the sensor system including gateway 110 may utilize external power, for example from the engine of a tractor pulling the trailer, from a land power source for example on a plugged in recreational vehicle or from a building power supply, among other options.

External power may further allow for recharging of batteries to allow the sensor system components such as gateway 110 to then operate in a power limited mode again. Recharging methods may also include other power sources, such as, but not limited to, solar, electromagnetic, acoustic or vibration charging.

The sensor system from FIG. 1 may be used in a variety of environments. One example environment in which the sensor system may be used is shown with regard to FIG. 2.

Figure 2:
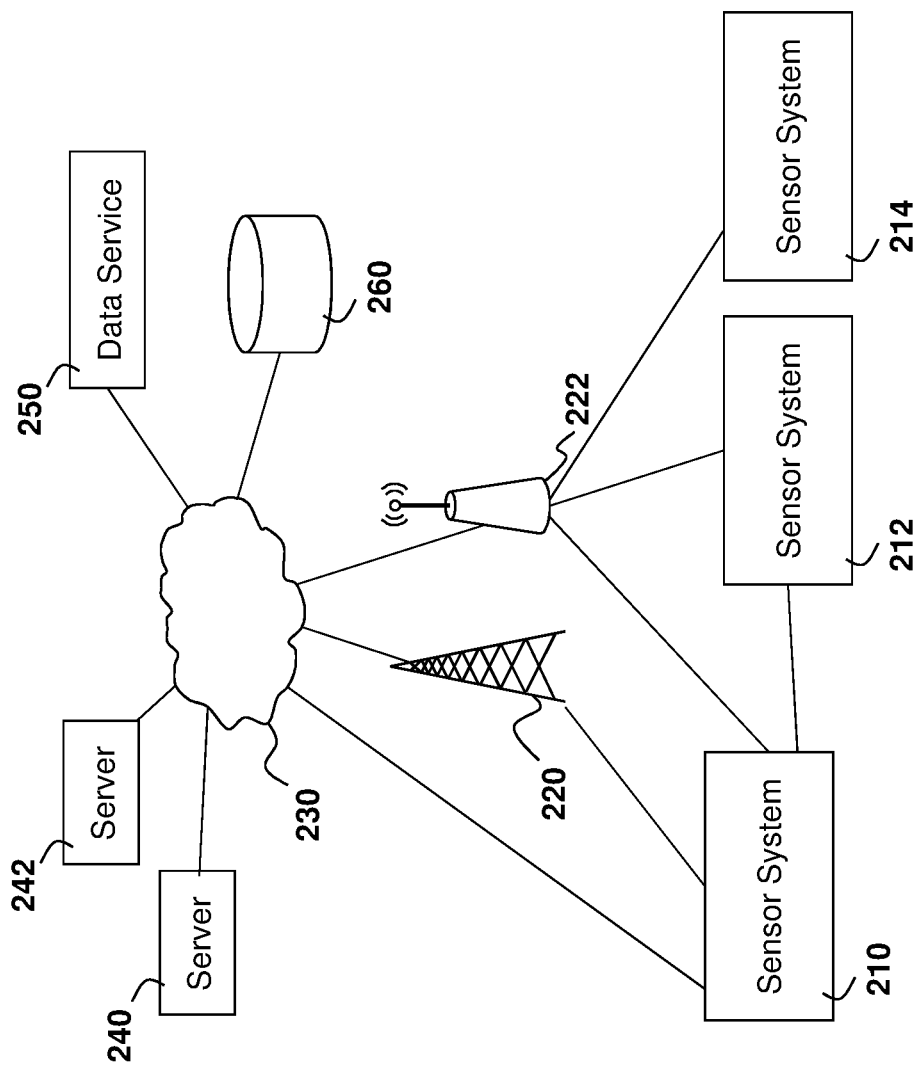
FIG. 2 is a block diagram showing an example environment for a gateway and sensor apparatus in accordance with the embodiments of the present disclosure.

Referring to FIG. 2, three sensor systems, namely sensor system 210, sensor system 212, and sensor system 214 are provided.

In the example of FIG. 2, sensor system 210 may communicate through a cellular base station 220 or through an access point 222. Access point 222 may be any wireless communication access point.

Further, in some embodiments, sensor system 210 could communicate through a wired access point such as Ethernet or fiber, among other options.

The communication may then proceed over a wide area network such as Internet 230 and proceed to servers 240 or 242.

Similarly, sensor system 212 and sensor system 214 may communicate with servers 240 or server 242 through one or both of the base station 220 or access point 222, among other options for such communication.

In other embodiments, any one of sensor systems 210, 212 or 214 may communicate through satellite communication technology. This, for example, may be useful if the sensor system is travelling to areas that are outside of cellular coverage or access point coverage.

In other embodiments, sensor system 212 may be out of range of access point 222, and may communicate with sensor system 210 to allow sensor system 210 to act as a relay for communications.

Communication between sensor system 210 and server 240 may be one directional or bidirectional. Thus, in one embodiment sensor system 210 may provide information to server 240 but server 240 does not respond. In other cases, server 240 may issue commands to sensor system 210 but data may be stored internally on sensor system 210 until the sensor system arrives at a particular location. In other cases, two-way communication may exist between sensor system 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of sensor systems 210, 212, 214, etc. For example, the server may be located essentially anywhere so long as it has network access to communicate with sensor systems 210, 212, 214, etc.

Server 240 may, for example, be a fleet management centralized monitoring station. In this case, server 240 may receive information from sensor systems associated with various trailers or cargo containers, providing information such as the location of such cargo containers, the temperature within such cargo containers, any unusual events including sudden decelerations, temperature warnings when the temperature is either too high or too low, maintenance status information, among other data. The server 240 may compile such information and store it for future reference. It may further alert an operator. For example, a sudden deceleration event may indicate that a trailer may have been in an accident and the operator may need to call emergency services and potentially dispatch another tractor to the location.

In other embodiments, server 240 may be a trailer tracking and maintenance server, which is used to determine how far a trailer has traveled and whether any parts of the trailer need to be maintained.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions.

Data repository or database 260 may for example provide information such as image data associated with a particular location, aerial maps, detailed street maps, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of sensor systems 210, 212, or 214 for processing at those sensor systems.

Utilizing a sensor system such as that described above, in accordance with one embodiment of the present disclosure, load balancing for the sensors may be performed.

Figure 3:
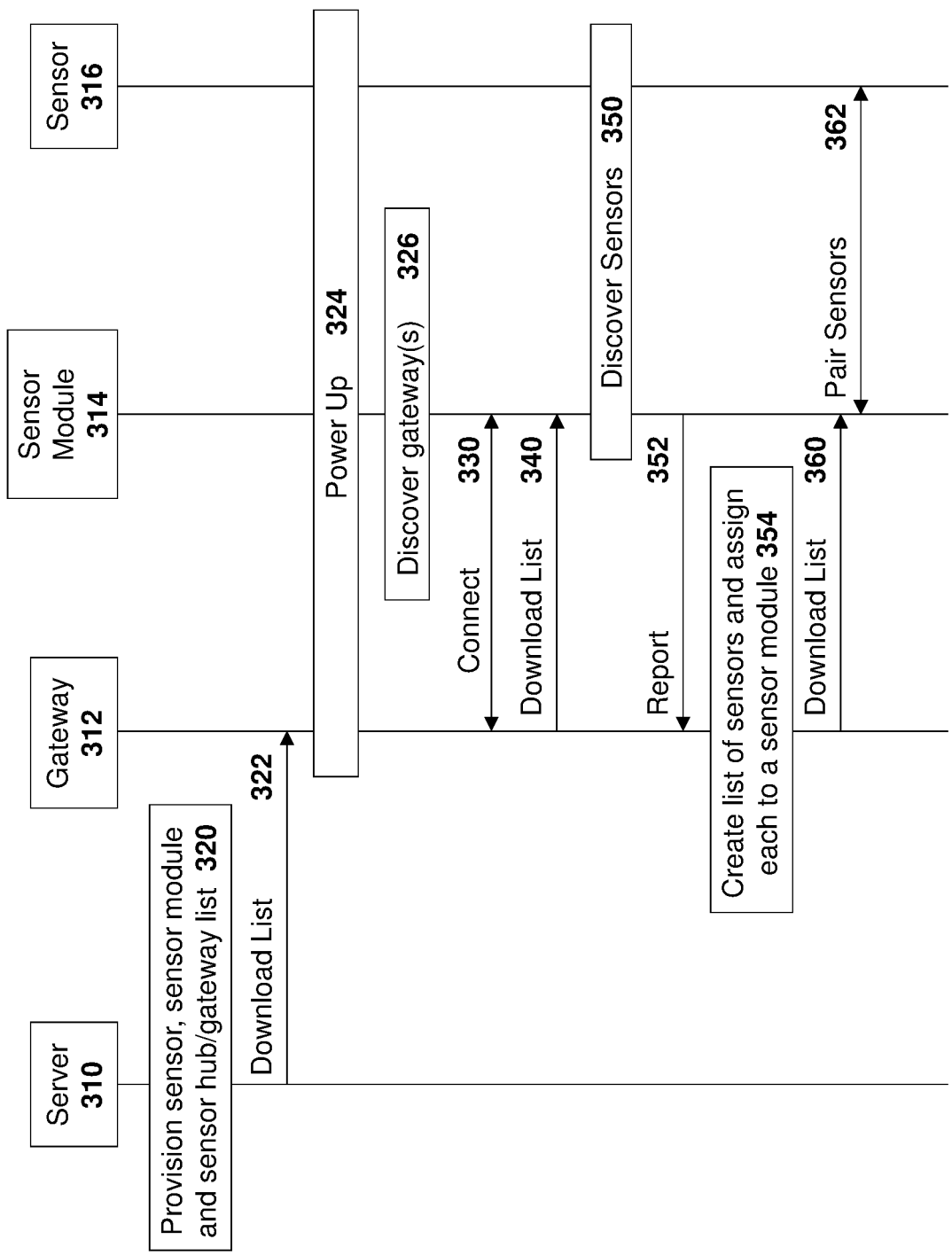
FIG. 3 is a data flow diagram showing provisioning of a sensor system.

Reference is now made to FIG. 3, which shows initial provisioning of a sensor system within a vehicle.

In particular, in the embodiment of FIG. 3, a server 310 communicates with at least one gateway 312. Server 310 may be any network or cloud server, or in some cases may be a local provisioning computer.

Gateway 312 can be any sensor hub, and in the embodiment of FIG. 3, only one gateway is shown. However, in some cases, multiple gateways or sensor hubs could be part of the sensor system.

Gateway 312 communicates with one or more sensor modules 314, which may communicate with one or more sensors 316. Further, in some embodiments gateway 312 may communicate directly with some sensors 316.

In the embodiment of FIG. 3, the sensor module 314 may operate as a slave to the gateway. Specifically, once the sensor module is registered with the gateway, it relays messages between the sensors and the gateway. These messages are for example provided below.

In an alternative embodiment, some processing may take place at the sensor module 314. For example, the sensor module may be a "smart sensor module", which can communicate and manage the sensors connected to it, taking readings from the sensors and passing reports to the gateway. In this way, a smart sensor module may take responsibility for its own sensors and relieves managerial burdens on the gateway itself.

In the embodiment of FIG. 3, server 310 provisions sensors, sensor modules and gateways, shown by block 320. Such provisioning may, for example, be performed by a technician installing such system on a trailer or vehicle. In other embodiments, the system may be provision based on a preconfigured sensor distribution for a particular type of trailer. Other options are possible.

From block 320, the server may then download the list of sensors, sensor modules and gateways to one or more of the gateways 312, as shown by arrow 322.

Once a gateway 312 receives the list of arrow 322, the sensors 316, sensor modules 314 and possibly other gateways are powered up, as shown by block 324.

Once powered up, the sensor modules 314 may discover the gateways 312, as shown by block 326. Such discovery may, for example, be done by listening for pilot signals or other signals from the gateways. It may further be accomplished by the sensor modules 314 sending a signal and waiting for a response from the gateways. Other options for sensor module and gateway discovery are possible.

Based on the discovery of the gateways or sensor hubs, each sensor module 314 may connect to its closest gateway 312, as shown by arrow 330. The connection may be based on various factors. In one embodiment, the factors may include signal strength. Thus, a sensor module may connect to a gateway that has the highest signal strength. In other embodiments, the signal-to-noise ratio may be utilized. Other options are also possible.

Based on the connection, the sensor hub or gateway 312 may download a list of sensor modules and other sensors to each sensor module, as shown by arrow 340.

Based on the downloaded list, each sensor module 314 may then discover sensors, shown by block 350, and report information, including the received signal strength indicator (RSSI) of each sensor, back to its sensor hub, as shown by arrow 352. In addition to RSSI or as an alternative, other measures can be used, including radio performance such as bit error rate (BER), signal-to-noise ratio (SNR) or signal-to-noise and distortion ratio (SINAD), together with packet data performance such as throughput, latency and jitter.

Based on the reported data, the sensor hub or gateway 312 creates a list of sensors and assigns the sensors most suitable to the sensor module based on the factors such as a radio frequency signal, a maximum number of sensors that a sensor module may maintain, among other factors. This is, for example, shown at block 354 of FIG. 3.

The sensor hub or gateway 312 then sends a list of the sensors to each sensor module 314, shown at arrow 360.

Based on the list received, a sensor module 314 may then pair with a sensor 316, as shown by arrow 362.

The above therefore shows the initial provisioning of a sensor system.

Once a sensor system is provisioned in accordance with the embodiment of FIG. 3, an initial check of the sensor system may be performed. Such initial check may be made, for example, only once after the initial provisioning of the system. In other embodiments, the initial check may be made periodically, for example every day, week or month. Other options are possible.

Figure 4:
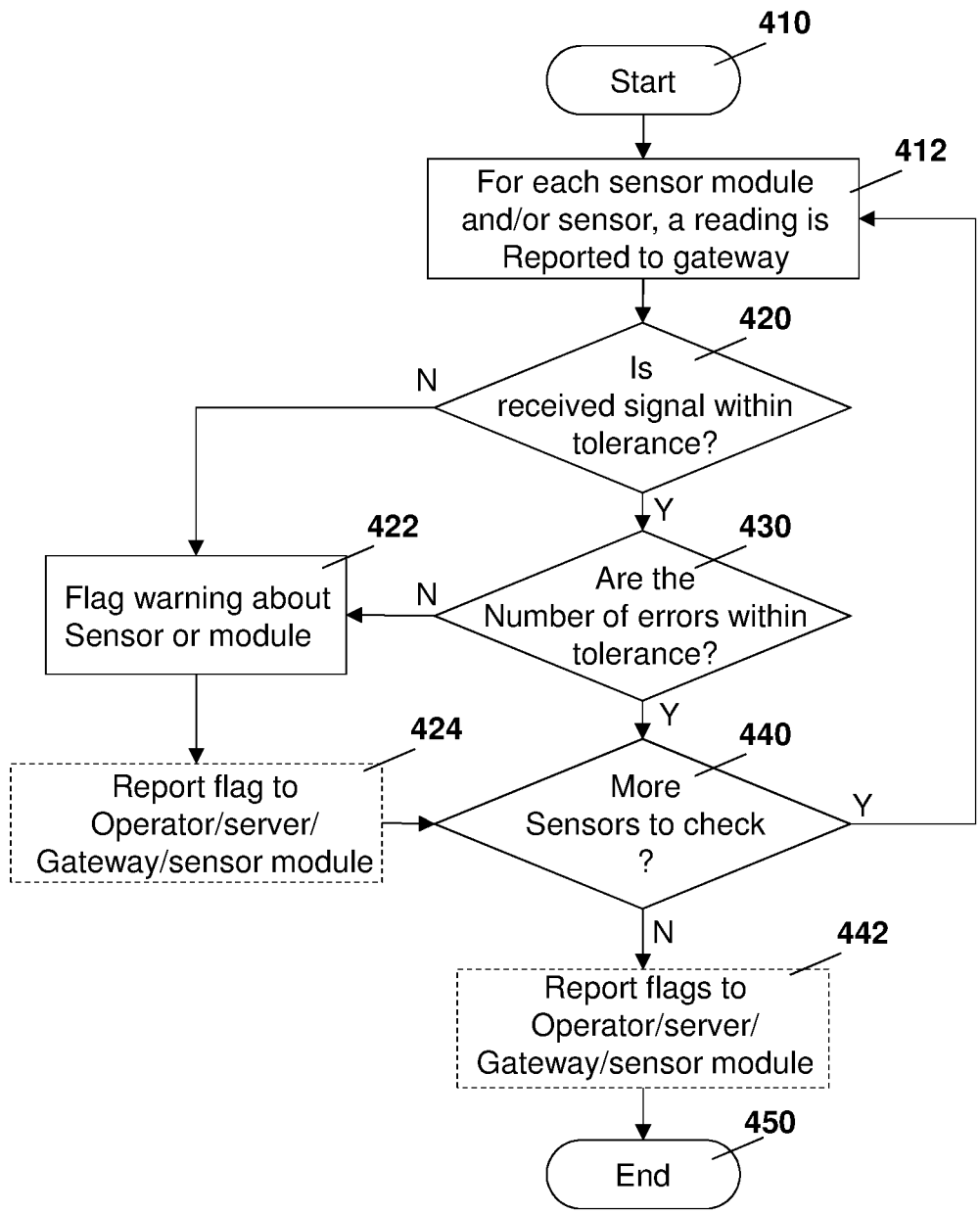
FIG. 4 is a process diagram showing initialization of a sensor system.

Reference is now made to FIG. 4. The embodiment of FIG. 4 starts at block 410 and proceeds to block 412. At block 412, the gateway records a reading from each sensor module within the sensor system. Such reading may contain readings about the sensors interacting with the sensor module. Further, the gateway records readings from all sensors that are connected directly to the gateway at block 412.

The process then proceeds to block 420 in which the gateway checks to see that the received signal from each sensor or sensor module is within a normal tolerance. For example, the received signal may be checked based on the received signal strength indication (RSSI) for the wireless sensor or based on signal quality, for example, for wired connections.

From block 420, if there are sensors that are outside of the tolerance, the process proceeds to block 422 in which a flag or warning about a sensor is raised. Such warnings may be in various forms. For example, the warning may indicate that the signal is low quality. Other warnings are possible, In one embodiment, the warning at block 422 may be a warning that is conveyed to a network server. In other embodiments, alerts may be provided or transmitted to a technician or vehicle operator, a server, or otherwise messaged. Other options are possible.

The gateway may also check against a manifest or stored list of sensors to make the determination when a reading is received from a sensor or sensor module. In this case, a warning for either the specific sensor or the sensor module may also be flagged at block 422. For example, the manifest might identify the type of sensor, and this may affect the tolerance used in making the determination at block 420. Other options are possible.

If the received signal from the sensor is within tolerance at block 420, the process proceeds to block 430 in which the gateway checks to see whether each sensor or sensor module is returning error frames. Such check may be based on recent communications from sensors or sensor modules, or may be based on a long-term history.

If the error rate is too high, the process proceeds from block 430 to block 422 in which a warning is flagged. In this case, the warning may be of various forms such as a short-term issue that is occurring for initial check or long-term issue, or that the sensor appears to be failing.

From either block 430 if there are no errors above the tolerance level, or from block 422, the process may optionally proceed to block 424 in which the flag raised may be provided to an appropriate destination, such as an operator, server, gateway or server module. The process then proceeds to block 440 in which a check is made to see whether other sensors or sensor modules need to be checked. If yes, the process may proceed back to block 412 to select a new sensor or sensor module.

Once all of the sensors or sensor modules are checked, the process may optionally proceed from block 440 to block 442 in which a list of any flags raised may be provided to an appropriate destination, such as an operator, server, gateway or server module.

The process then proceeds to block 450, in which the process ends.

Based on the embodiment of FIG. 4, each reading of the sensors or sensor modules may be assessed by the gateway against various thresholds that may be stored at the gateway. These thresholds may vary depending on the type of sensor, vehicle, environmental issues, among other factors.

After the initial check, balancing of the sensor system may be done. The balancing may be done periodically, or may be dynamic based on factors such as location of the vehicle, speed of the vehicle, detected lack of sensor data, among other factors. Further, in some embodiments balancing could also be automatically triggered by a Server, or it could be triggered based on an Operator command from either the server or some other interface to the system.

Figure 5:
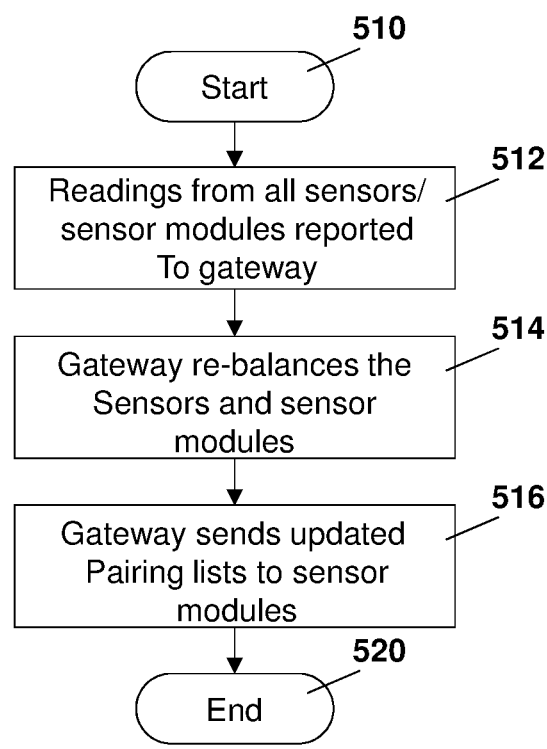
FIG. 5 is a process diagram showing a process at a gateway for balancing a sensor system.

Reference is now made to FIG. 5, which shows balancing in accordance with one embodiment of the present disclosure. The balancing of the system is done from a gateway in the embodiment of FIG. 5.

Balancing could occur based on various factors. For example, balancing may be periodic. In other cases, balancing may be based on a schedule sent from a server. In other cases, balancing could be trigger by a message from a server. In other cases, balancing may be based on factors such as environmental changes or readings from particular sensors. For example, if a sensor detects an anomalous event, this may trigger balancing. In still further cases, balancing may be triggered by a battery level in a sensor, sensor module or gateway. For example, if the battery level in a sensor module falls below a threshold, this may trigger re-balancing to have the sensor module server fewer or no sensors. Other examples of re-balancing triggers are possible.

The process of FIG. 5 starts at block 510 and proceeds to block 512 in which readings from the sensor modules and sensors connected to the gateway are reported to the gateway.

In the embodiment of FIG. 5, the gateway or sensor hub can have a policy that stores all thresholds and warning levels for the various types of sensors modules and sensors within the system. This policy can be static for a particular load or journey, and be programmed within the gateway. For example, the policy may be loaded manually or by plugging in a memory device such as those utilizing USB.

Alternatively, the policy may be provisioned from an external source such as a connection between the gateway and the server or through a tether from a gateway to a device such as a smart phone or tablet. The policy could be sent in a dedicated message in one embodiment.

In other cases, the policy may be provided concurrently with messaging from a server or network. For example, a policy could accompany a balancing schedule from a network.

The policy can be used to determine if the sensors or sensor modules need to be re-balanced. For example, there could be a policy per sensor on whether the sensor could be rebalanced or not, what type of sensor module/gateway it could connect with, among other such policy information. For instance, a TPMS sensor may only be able to connect to a TPMS Sensor Module in one embodiment.

Thus, the process next proceeds to block 514 in which the gateway may re-balance the sensors and sensor modules by allocating sensors to sensor modules and/or the gateway. The sensor gateway may compare readings from sensors and/or sensor modules with thresholds in the policy, and decide which sensors should be allocated to which sensor module to achieve the best connectivity within the system. The determination about allocating may, in some cases, use the policy for the sensor.

The re-balancing at block 514 can use various algorithms to make decisions. These algorithms may consist of the type of sensor, age of the sensor, type of vehicle, environmental issues, among other factors.

Further, the re-balancing at block 514 may use the RSSI values of the various sensor modules and sensors. Thus, if the RSSI for a particular sensor is below a threshold, as for example provided in a policy, the gateway may decide the sensor should communicate with a different sensor module or with a gateway/hub, and thus allocate the sensor appropriately. However, other options and factors besides signal strength may be considered by the gateway and the policy.

The algorithms may also use historic data for decision making. For example, when a policy condition is met, in one embodiment the gateway may send data to a server or cloud storage. The network could provide indications back to the gateway about particular sensors if trends are detected. The storage of historic data may have the benefit of providing indications of which vehicles need to have sensors changed and further tracks changes of sensors over time.

The gateway may, at block 514, further compare readings for sensors and/or sensor modules, and may decide which sensors or sensor modules should be replaced. In particular, if sensor readings are consistently out of balance with other sensor readings then it may indicate that the sensor is faulty and the sensor needs to be replaced.

If a sensor needs to be replaced, the gateway may further decide whether the system then needs to be balanced again once such sensor is replaced.

Based on the determination for rebalancing at block 514, the process proceeds to block 516 in which the gateway sends updated pairing lists to the sensor modules. The updated pairing list may indicate to the sensor modules which sensors they should interact with.

From block 516 the process proceeds to block 520 and ends.

Therefore, based on FIG. 5, the sensor system may be balanced to ensure that communication is maintained between the various sensor modules and sensor gateways. Further, detection of faulty sensors may be made.

The balancing of the embodiment of FIG. 5 can be performed at various times. For example, it may be performed periodically on the vehicle. It may further be performed when a vehicle is in a rest state for a threshold period of time and starts to move. In some cases, it may be done only once the vehicle is moving.

Further, rebalancing of FIG. 5 may be done when a sensor or sensor module is added, removed or replaced. In this case, the sensor hub or gateway may also be updated with information about the addition or removal of the sensor or sensor module.

In a further embodiment, a vehicle operator may also decide that a type of sensor should be upgraded. The gateway could use a provisioned list of sensors to find the specific sensors that need to be upgraded and could report this list.

Further, for some sensor systems, it may be possible to perform the balancing of FIG. 5 in a dynamic balancing system that can perform the balancing while the vehicle is in motion. This allows early detection of issues and warnings, which may be provided to the driver or fleet management system.

Further, the reporting of data may be compared with historical data to determine trends and baselines of sensor readings. This may then lead to new policies being created and provided to the gateway.

The above therefore provides systems and methods for the provisioning, initialization, and balancing of a sensor system. The balancing may be performed dynamically in some embodiments, allowing balancing to occur while sensors are operational. For example, balancing may occur while a vehicle is moving, allowing factors such as a load, vibration, or noise, among other factors, to be taken into account for the sensor system.

Data may be exchanged with servers such as server 240, 242, or 310. Such server may be any network node. For example, one simplified server that may perform the embodiments described above is provided with regards to FIG. 6.

Figure 6:
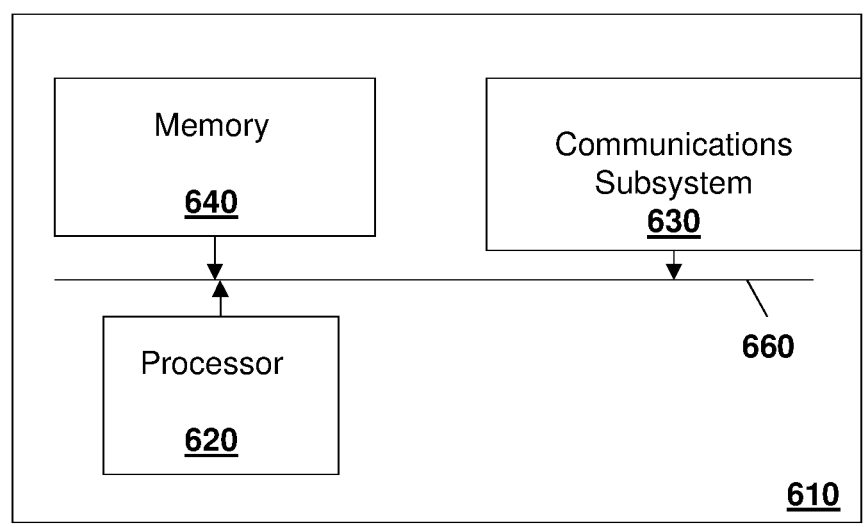
FIG. 6 is a block diagram of an example computing device capable of being used in accordance with the embodiments of the present disclosure.

In FIG. 6, server 610 includes a processor 620 and a communications subsystem 630, where the processor 620 and communications subsystem 630 cooperate to perform the methods of the embodiments described herein.

Processor 620 is configured to execute programmable logic, which may be stored, along with data, on server 610, and shown in the example of FIG. 6 as memory 640. Memory 640 can be any tangible, non-transitory computer readable storage medium, such as optical (e.g., CD, DVD, etc.), magnetic (e.g., tape), flash drive, hard drive, or other memory known in the art.

Alternatively, or in addition to memory 640, server 610 may access data or programmable logic from an external storage medium, for example through communications subsystem 630.

Communications subsystem 630 allows server 610 to communicate with other devices or network elements.

Communications between the various elements of server 610 may be through an internal bus 660 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method for provisioning sensors at a gateway, comprising:
   receiving, from a server, a list of sensors, sensor modules, and gateways;
   powering up the sensors, sensor modules, and gateways;
   establishing a connection with at least one sensor module of the sensor modules;
   transmitting to the at least one sensor module, the list of sensors, sensor modules, and gateways;
   receiving, from the at least one sensor module, a report indicating at least one of a signal strength, a signal to noise ratio, a bit error rate, or a signal to noise and distortion ratio, for each sensor of the sensors; and
   based on the report, assigning each sensor to one sensor module of the sensor modules.

2. The method of claim 1, wherein the gateway is included in the list of sensors, sensor modules, and gateways.

3. The method of claim 1 wherein establishing the connection with the at least one sensor module comprises transmitting a pilot signal.

4. The method of claim 1, wherein establishing the connection with the at least one sensor module comprises receiving a pilot signal from the at least one sensor module.

5. The method of claim 1, wherein the at least one sensor module selects the gateway based on at least one of signal strength, and signal to noise ratio.

6. The method of claim 1, wherein the report further indicates at least one of throughput, latency, and jitter, for each sensor of the sensors.

7. The method of claim 1, wherein the assigning of each sensor is based on a maximum number of sensors per sensor module.

8. The method of claim 1, further comprising:
   receiving, for each sensor and sensor module, an indication of a signal strength; and
   identifying sensors with a signal strength below a tolerance level.

9. The method of claim 8 further comprising sending a message to the server indicating the identified sensors.

10. A gateway for provisioning sensors within a sensor system, the gateway comprising:
    a processor; and
    a communications subsystem,
    wherein the gateway is configured to:
      receive, from a server, a list of sensors, sensor modules, and gateways;
      power up the sensors, sensor modules, and gateways;
      establish a connection with at least one sensor module of the sensor modules;
      transmit to the at least one sensor module, the list of sensors, sensor modules, and gateways;
      receive, from the at least one sensor module, a report indicating at least one of a signal strength, a signal to noise ratio, a bit error rate, or a signal to noise and distortion ratio, for each sensor of the sensors; and
      based on the report, assign each sensor to one sensor module of the sensor modules.

11. The gateway of claim 10, wherein the gateway is included in the list of sensors, sensor modules, and gateways.

12. The gateway of claim 10 wherein establishing the connection with the at least one sensor module comprises transmitting a pilot signal.

13. The gateway of claim 10, wherein establishing the connection with the at least one sensor module comprises receiving a pilot signal from the at least one sensor module.

14. The gateway of claim 10, wherein the at least one sensor module selects the gateway based on at least one of signal strength, and signal to noise ratio.

15. The gateway of claim 10, wherein the report further indicates at least one of throughput, latency, and jitter, for each sensor of the sensors.

16. The gateway of claim 10, wherein the assigning of each sensor is based on a maximum number of sensors per sensor module.

17. The gateway of claim 10, wherein the gateway is further configured to:
    receive, for each sensor and sensor module, an indication of a signal strength; and
    identify sensors with a signal strength below a tolerance level.

18. The gateway of claim 17 wherein the gateway is further configured to send a message to the server indicating the identified sensors.

19. A non-transitory computer-readable medium having stored thereon executable code for execution by a processor of a gateway, the executable comprising instructions for:
    receiving, from a server, a list of sensors, sensor modules, and gateways;
    powering up the sensors, sensor modules, and gateways;
    establishing a connection with at least one sensor module of the sensor modules;
    transmitting to the at least one sensor module, the list of sensors, sensor modules, and gateways;
    receiving, from the at least one sensor module, a report indicating at least one of a signal strength, a signal to noise ratio, a bit error rate, or a signal to noise and distortion ratio, for each sensor of the sensors; and based on the report, assigning each sensor to one sensor module of the sensor modules.

\* \* \* \* \*